United States Patent
Davison et al.

[11] Patent Number: 6,089,361
[45] Date of Patent: Jul. 18, 2000

[54] S-CAM SPIDER BUSHING CARTRIDGE

[75] Inventors: Kent E. Davison, Columbia; David A. Braun, Ft. Wayne, both of Ind.

[73] Assignee: Dana Corporation, Toledo, Ohio

[21] Appl. No.: 08/978,193

[22] Filed: Nov. 25, 1997

[51] Int. Cl.[7] .............................. F16D 65/14; F16C 17/00
[52] U.S. Cl. ...................... 188/206 R; 188/325; 384/275
[58] Field of Search ................................ 188/330, 205 R, 188/206 R, 325, 79.55; 384/130, 275, 286, 296, 295, 322, 289, 290, 291, 153, 151, 152, 397

[56] References Cited

U.S. PATENT DOCUMENTS

| | | | |
|---|---|---|---|
| 2,163,090 | 6/1939 | Harry | 384/291 |
| 2,331,652 | 10/1943 | Buckendale | 168/205 |
| 2,892,662 | 6/1959 | Scheel | 308/36.1 |
| 4,337,851 | 7/1982 | Pringle | 188/330 |
| 4,445,597 | 5/1984 | Baltare | 188/206 |
| 4,452,347 | 6/1984 | Dozier | 188/330 |
| 4,526,254 | 7/1985 | Baltare | 188/341 |
| 4,576,488 | 3/1986 | Steiner et al. | 384/291 |
| 4,701,061 | 10/1987 | Stubbersfield | 384/484 |
| 4,854,427 | 8/1989 | Baroni | 188/205 |
| 4,890,939 | 1/1990 | Evans | 384/322 |
| 5,141,339 | 8/1992 | Evans | 384/130 |
| 5,238,310 | 8/1993 | Layfield | 384/145 |
| 5,316,111 | 5/1994 | Layfield | 188/205 |

*Primary Examiner*—Christopher P. Schwartz
*Assistant Examiner*—Robert A. Siconolf
*Attorney, Agent, or Firm*—Oldham & Oldham Co., LPA

[57] ABSTRACT

An improved bushing assembly for the outboard end of a brake cam shaft is provided with a bushing which establishes a grease flow pathway within the bushing assembly. Grease enters an aperture formed in a boss of the brake spider which holds the bushing through a grease zerk which is aligned with a first radial hole in the bushing, so the fresh grease injected goes directly to a grease reservoir between the bushing and the shaft. Flow channels provided in the bushing interior surface guide the grease around the shaft to a second radial hole which is diametrically opposite the first radial hole. Sealing means on the shaft restrict grease flow axially from the bushing along the shaft. Grease may be purged through the second radial hole to an annular space between a flanged inboard end of the bushing and the periphery of the aperture, from which the grease may exit. The flanged end of the bushing has tabs for engaging slots in the boss to align the bushing and to prevent rotation within the aperture. Because of the symmetric placement of the tabs with the radial holes, the bushing may be used in a first position and rotated 180° for use in a second position before it needs to be replaced.

23 Claims, 3 Drawing Sheets

5,089,361

S-CAM SPIDER BUSHING CARTRIDGE

The present invention relates to a bushing assembly for use with a cam shaft associated with the brakes of a vehicle. More particularly, the present invention relates to a bushing assembly which may be inserted into a boss on the brake spider and which may support the cam shaft rotatably along an axle in a generally parallel relationship to the axle, particularly near the outboard end of the cam shaft. Even more particularly, the present invention relates to a bushing assembly which may removed from the inboard side of the brake spider and, upon its removal, allow the cam shaft to be angled sufficiently within the spider boss and around the wheel hub so that the shaft may be removed in an outboard direction without requiring removal of the wheel hub.

BACKGROUND OF THE ART

In an air brake for a vehicle, particularly a truck or a semi trailer, the expansion of an air chamber by actuation of a brake pedal causes a shaft positioned on two bushing assemblies located adjacent to the wheel axle to rotate. The rotation of the shaft rotates an S-cam located at the outboard end of the shaft. Brake shoes which are held in contact with the S-cam are urged outwardly by the rotation of the S-cam and its shape. The outward motion of the brake shoes places brake liners mounted on the brake shoes into frictional engagement with a brake drum of the wheel hub, resulting in braking of the wheel mounted on the hub.

The shaft is an area of concern in maintaining the air brakes. It is important to be able to remove the shaft for maintenance, particularly without removing the wheel hub. It is also important to be able to remove and maintain the bushings which permit the rotation of the shaft while holding it in fixed position relative to the axle. The first of the bushings is located near the inboard end of the shaft near the brake actuator, and it is generally referred to in this invention as the "inboard bushing". The second of the bushings is located at the brake spider, where the shaft typically passes through a boss in the spider. Since this second bushing is located towards the outboard end of the shaft, we refer to it in this application as the "outboard bushing" or as the "spider bushing". While some of the problems with the bushings are shared by both bushings, there are other problems which are unique to each of the bushings. One problem in the art is wear surface contamination in the bushing, particularly the bushing nearer the brake spider. The present invention is focused on the outboard or spider bushing.

SUMMARY OF THE INVENTION

It is therefore an object of the present invention to provide an outboard bushing assembly for a brake shaft of a vehicle which reduces bushing wear through a grease sealing and purge system which eliminates wear surface contamination. This and other objects of the invention are achieved by a brake shaft assembly for a vehicle having an axle with a wheel hub at an end of the axle and a brake actuating means located inboard from the wheel hub. The brake shaft assembly comprises a shaft, a support bracket, a first bushing assembly, a brake spider and a second bushing assembly. The shaft has a first end and a second end. The first end has a brake actuating lever arm attached to it and the second end has a cam fixed on it for urging brake shoes attached to the spider outwardly. The support bracket provides an aperture for passage of the shaft and the first bushing assembly supports the shaft rotatably in the aperture of the support bracket. The brake spider is affixed to the axle and has a boss formed at one end thereof with an aperture for passage of the shaft formed through the boss. The second bushing assembly surrounds the shaft near the second end and retains the shaft in the aperture of the brake spider boss. This second bushing assembly comprises the boss, a cylindrical bushing, a grease zerk, a pair of bushing end seals and locking means for retaining the bushing in the aperture in a non-rotating manner. The boss has a hole communicating an outer surface of the boss with the aperture, the hole providing a seat within which the grease zerk is seated. The cylindrical bushing has an outside surface sized and adapted to be received in the aperture and an inside surface sized and adapted to receive the shaft. One end of the cylindrical bushing has a flanged portion. The pair of bushing end seals are seatable in the shaft at each end of the bushing for retaining grease. The locking means are provided on the inboard side of the boss and on the flanged portion of the bushing.

BRIEF DESCRIPTION OF THE DRAWINGS

These and other aspects of the present invention will be better understood when reference is made to the accompanying drawing, wherein identical parts are identified by identical reference numerals and wherein.

DETAILED DESCRIPTION OF THE INVENTION

Figure 1:
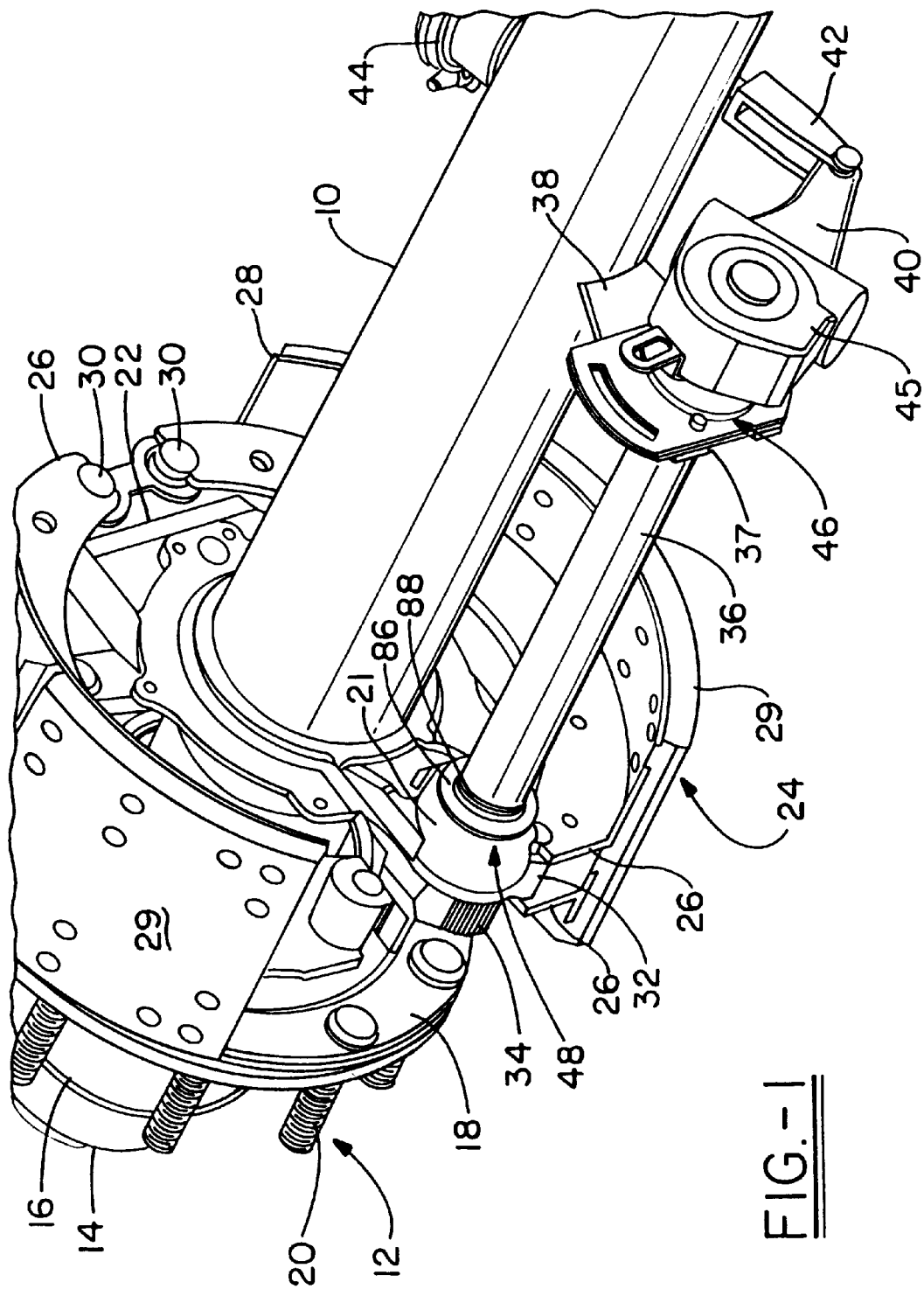
FIG. 1 is a perspective view of an axle of a vehicle having an S-cam brake assembly mounted thereon.

The present invention is shown in FIG. 1 where a perspective view of the external structures of a vehicle brake assembly are disclosed. Particularly, one end of an axle 10 is shown. The axle 10 terminates at an outboard end in a wheel end assembly, generally shown as 12. It will be understood that the opposite end of the axle 10 will be similarly provided. The present invention is applicable to both driven and non-driven axles, with the difference being that a driven axle will have an drive shaft (not shown) housed within the axle 10, whereas a non-driven axle will lack such a drive shaft. The outboard end of the axle 10 is provided with a spindle 14 which may have a wheel hub 16 rotatably mounted thereupon. If the axle 10 is a driven axle, the wheel hub 16 will be rigidly affixable to the drive shaft which passes through a hollow spindle 14 so that drive torque is transmitted directly from the drive shaft to the wheel hub 16. If the axle in non-driven, as is the case of FIG. 1, the wheel hub 16 will rotate freely on a bearing set interposed between the wheel hub and the spindle 14. Typically, the bearing set will comprise an inboard bearing and an outboard bearing, and details of such a bearing set will be known to one of skill in this art. The wheel hub 16 is provided with a flanged portion 18 and a plurality of threaded studs 20 for the mounting of a wheel rim (not shown) on the wheel hub. A brake spider 22 is rigidly affixed to the axle 10. A pair of opposed brake shoes 24 are mounted to the brake spider 22. Each of the brake shoes 24 has a pair of spaced apart web members 26, the radially outward surface of each web member 26 terminating in a brake table 28, upon which frictional brake liners 29 are mounted. One end of each web member 26 is pivotably mounted to the brake spider 22 by an anchor pin 30 and the second end of each web member has a roller 32 mounted in it. The rollers 32 in the web members are held in contact with a cam 34 which is fixed to an outboard or second end of a shaft 36, through biasing means, typically springs (not shown). The shaft 36 passes through a boss 21 formed in the brake spider 22, which serves as a support bracket for the second end of the shaft. The axis of the shaft 36 is generally positioned parallel to the axis of the axle 10. An inboard or first end of the shaft 36 also passes through an aperture 37 in an inboard support bracket 38 which is rigidly affixed to the axle housing, typically by welding. The boss 21 and the aperture 37 in the respective support brackets 22, 38 are aligned for keeping the shaft 36 essentially parallel to the axis of the axle 10. At the inboard or first end of the shaft 36, a brake actuating lever arm 40 is attached, so that longitudinal motion of a brake actuator rod 42 affixed to a brake actuating means 44 results in rotation of the shaft. It is this rotation of the shaft 36 which effects rotation of cam 34, resulting in outward expansion of the brake shoes 24 against a brake drum (not shown) on the wheel rim mounted to the wheel hub 16. This type of brake actuating mechanism as generally described is known in the prior art. As shown in FIG. 1, the attachment of the brake actuating arm 40 to the inboard end of cam shaft 36 is achieved through the use of a brake cam adjuster 45, which is integral with the arm 40 and which is known in the art. The brake cam adjuster 45 is used to adjust the brakes as the brake liners 29 wear through use, necessitating adjustment to the brake cam 34 to keep it in good operational order.

At the inboard support bracket 38 and the brake spider 22 (which serves as the outboard support bracket) respectively, it is necessary to provide a first and a second bushing assembly 46, 48 for supporting the shaft 36 rotatably, substantially parallel to the axle housing. The first or inboard bushing assembly 46 surrounds the shaft 36 near the first or inboard end, that is, near the brake actuator 44 and retains the shaft in the aperture in the support bracket 38. The second or outboard bushing assembly 48 surrounds the shaft 36 near the outboard or second end and retains the shaft in the boss of the brake spider 22. The first or inboard bushing assembly 46 may be of a type as known in the prior art, as it is not the focus of the present invention. The second or outboard bushing assembly 48 is, however, the focus of the present invention and attention is now directed to that bushing assembly, and particularly to the details as disclosed in FIGS. 2–3.

Figure 2:
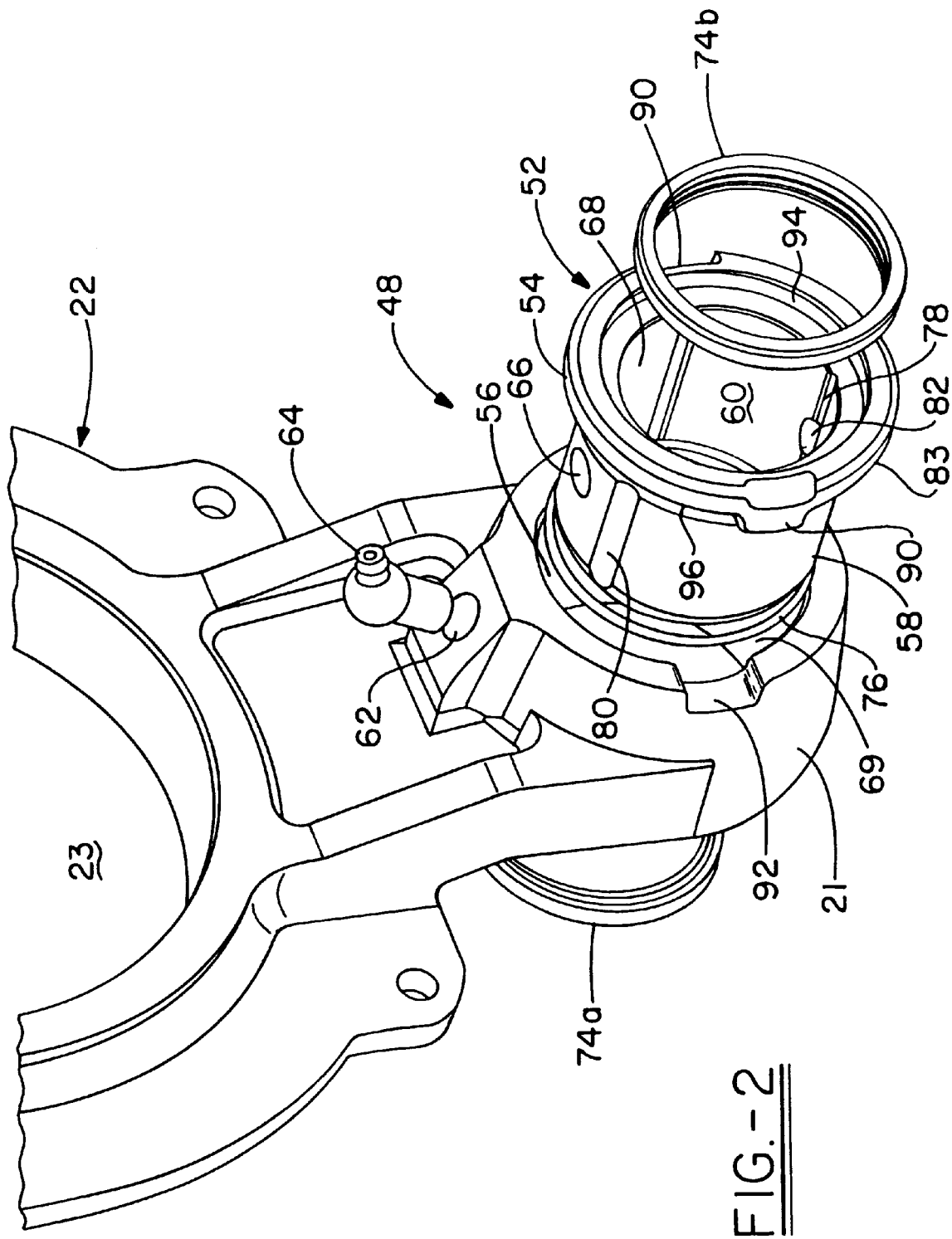
FIG. 2 is a exploded perspective view of the S-cam bushing assembly of the present assembly.
Figure 3:
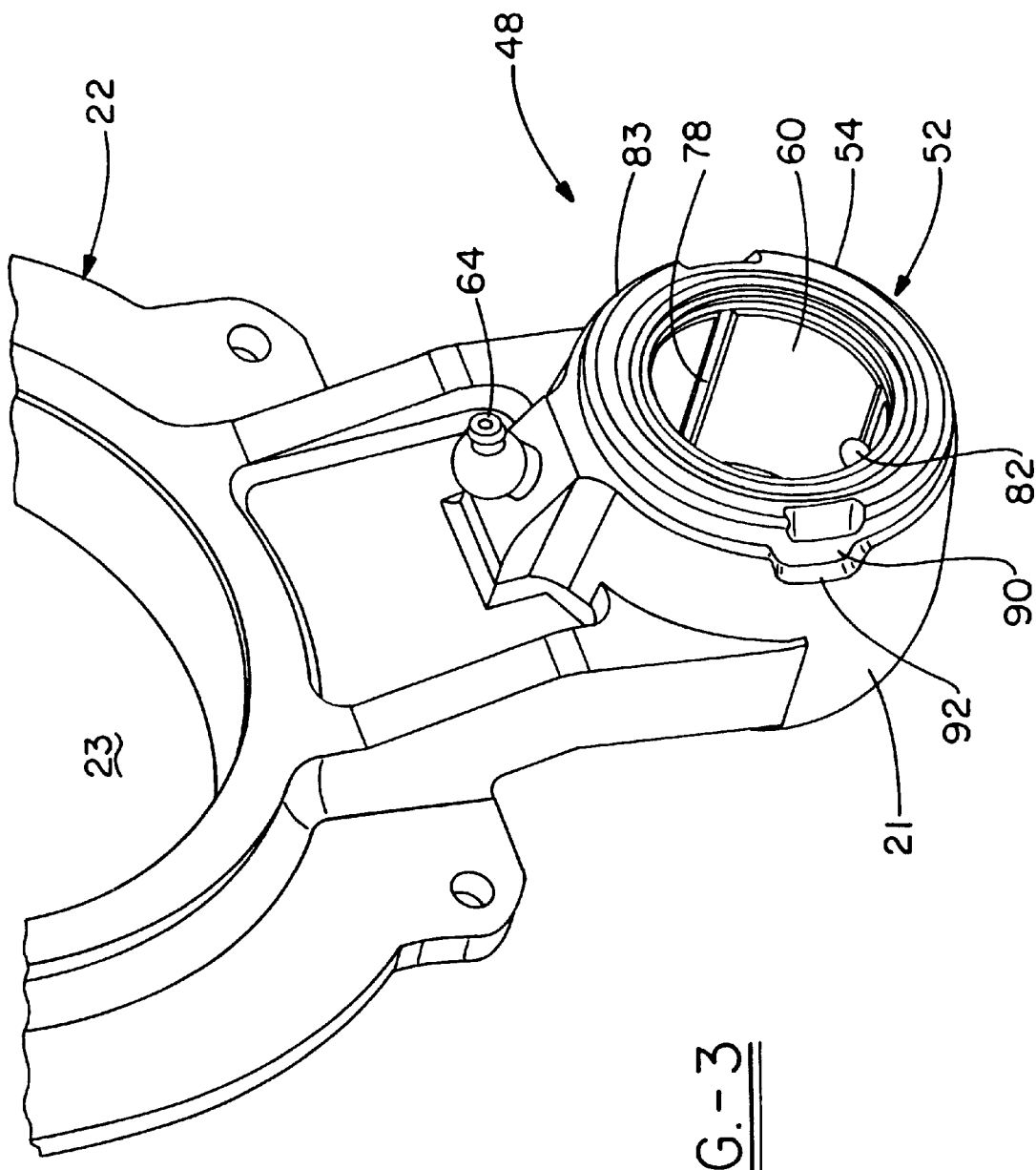
FIG. 3 is an assembled perspective view of the present invention.

FIGS. 2 and 3 show a perspective view of the outboard bushing assembly 48, in exploded and assembled conditions, respectively. The outboard bushing assembly 48 generally comprises the boss 21 and a generally cylindrical bushing subassembly 52. The boss 21 is preferably produced as an integral part of the brake spider 22, which is shown in FIGS. 2 and 3 in isolation from the axle. Only a portion of the spider 22 is shown in FIGS. 2 and 3, the most notable feature distinctly seen being the large aperture 23 through which the axle passes. It is this aperture and its facing surfaces which provide the site for welding the spider 22 to the axle. The end of the spider 22 opposite the boss 21 provides apertures for attachment of the anchor pins 30, as described above, but this opposite end of the spider is not shown in FIGS. 2 and 3, as it is no different from the prior art. An aperture 56 passing through the boss and having an axis substantially parallel to the axis of the aperture 23 for the mounting of axle 10 provides an interior cavity for receiving the bushing subassembly 52 and generally holds the bushing subassembly in a generally non-rotating manner. The bushing subassembly 52 comprises a bushing 54, an inboard end seal 74b and an O-ring 76. Further details of the seal 74b and the O-ring 76 are provided below. The bushing 54 is generally an annular cylinder with an outside surface 58 and an inside surface 60. The outside surface 58 is sized and adapted to be received in the aperture 56 in boss 21 and the inside surface 60 is sized and adapted to receive the shaft 36, each of the fits (between aperture 56 and outside surface 58 and between inside surface 60 and shaft 36) being sliding engagements. Lubrication of each of these fits or interfaces with grease is appropriate to minimize wear of these surfaces, prolong the life of the bushing, prevent or retard corrosion, and to allow ready disassembly of the components for service.

The boss 21 is provided with a hole 62 for insertion of a grease zerk 64 for communicating the exterior of the boss with the aperture 56, so hole 62 passes through the boss and opens into the aperture. The bushing 54 is intended to remain essentially non-rotational in the aperture 56. Bushing 54 is provided with a radial hole 66 which communicates the outside surface 58 of the bushing to the inside surface 60. By positioning this radial hole 66 so that it is directly under the opening of hole 62 into aperture 56, grease injected through grease zerk 64 flows preferentially into radial hole 66. A grease conduit is thereby established, directly communicating the outside of the boss 21 with the shaft 36 as it passes through the bushing 54. Because of the sliding engagement between the inside surface 60 of the bushing 54 and the exterior of the shaft 36, a first grease reservoir 68 is effectively formed along the length of the shaft inside the bushing. A second grease reservoir 69 is formed along the length of the outside surface 58 of the bushing 54, because of the sliding engagement between the outside surface and the interior surface of aperture 56. These grease reservoirs 68, 69 are provided with axial flow limits by the placement of end seals along the shaft 36 and the O-ring 76, as will now be described.

A system of seals retain grease in the grease reservoirs 68, 69 and prevent contaminants from entering the reservoirs. The outboard end of aperture 56 is sealed by an end seal 74a, which is sized and adapted to be seated on shaft 36. The inboard end of the bushing subassembly 52 is sealed by end seal 74b, which is also sized and adapted to be seated on shaft 36. In the preferred embodiments of the invention, this inboard end seal 74b rests inside a counterbore 94 in the flanged end and is seated there prior to installation of the bushing subassembly 52 onto the shaft 36. The inboard end of aperture 56 is sealed by the O-ring 76, which is seated in a groove 96 provided on the outside surface 58 of bushing 54. The groove 96 is preferably positioned near the flanged end 83 of bushing 54, the internal surfaces of the counterbore providing a shoulder for the end seal 74b. The O-ring 76 seals against the inner surface of aperture 56 from this position.

It is desirable in some embodiments of the invention to provide both the inside and outside surfaces 58, 60 respectively, of bushing 54 with channels for facilitating grease flow. The preferred channels are longitudinal, although some circumferential channels may be provided. A longitudinal channel 78 is shown on surface 60 and an analogous longitudinal channel 80 is shown on surface 58 in FIG. 2. If one or more longitudinal channels 80 are provided, is may be desirable that the depth of one of the channels be deeper than the depth of O-ring groove 96, allowing a grease purge path below and past O-ring 76.

Grease injected into zerk 64 flows through hole 62 in the spider 22 and then through hole 66 in bushing 54 and onto shaft 36. With the inboard end of bushing 54 being sealed by end seal 74b to shaft 36, the grease fills the reservoir 68 between the bushing and the shaft, including longitudinal grooves 78. Grease in this reservoir 68 moves outwardly along the grooves as well as radially around the shaft 36 toward the hole 82. Grease which exits the grease reservoir 68 through hole 82 fills the second grease reservoir 69, which is sealed by end seal 74*a*. Grease exiting the outboard end of grooves 78 is also blocked by from further axial flow by end seal 74*a*, but may flow radially between the end seal and the outboard end of the bushing to grease reservoir 69, and longitudinal grooves 80. Reservoir 69 is sealed at the inboard end by O-ring 76, but providing one channel 80 which is deeper than O-ring groove 96 allows the purging of grease and trapped air past the O-ring. In this manner, a preferred grease flow pattern is established and maintained within the assembly 48. It may be desirable in some embodiments to orient the inboard end seal 74*b* so that it provides a secondary purge path for the interior grease reservoir 68. The purging of contaminated grease from the bushing assembly provides visual verification that grease has filled the entire grease path, including both reservoirs 68, 69.

Further understanding of the invention will be obtained by description of the manner of assembly of the bushing at the spider boss. The end seal 74*a* is positioned at the outboard end of the boss aperture 56, in which the bushing subassembly 52 has not yet been installed. This leaves the entire interior volume of aperture 56 available for maneuvering the shaft 36. The inboard end of shaft 36, that is, the end opposite cam 34, is brought from the outboard side of aperture 56 and passed therethrough. Because the inside diameter of the aperture 56 is significantly larger than the outside diameter of shaft 36, the axis of shaft 36 may be placed through aperture 56 with the axis of the shaft tilted at a significant angle respective to the axis of the aperture. This ability to tilt the shaft and still pass it through the aperture permits entry and removal of the shaft from the outboard side of the aperture while the wheel hub 18 is in place. Quick reference to FIG. 1 shows that the flanged portion 18 of wheel hub 16 lies directly in a line representing the outboard extension of the axis of shaft 36 when the hub and the shaft are in place. By passing the inboard end of the shaft sequentially through end seal 74*a* and aperture 56, the first end of shaft, that is, the end bearing the cam 34 can be brought into substantially the correct position. At this point, end seal 74*a* may be properly seated in shaft 36. Starting from the inboard end of the shaft, the bushing subassembly 52 may now be passed along the length of the shaft until it reaches boss 21. The flanged end 83 of bushing 54 is provided with a pair of diametrically opposed tabs 90 which are sized and adapted to engage slots 92 which are formed at diametrically opposed points on the inboard periphery of aperture 56. Tabs 90 fit into slots 92 and effectively lock the bushing in place, not only preventing any substantial rotation of the bushing in the aperture, but also aligning first radial hole 66 beneath grease zerk receiving hole 62. As shown in the preferred embodiment presented in the drawings, the tabs 90 are positioned 90° offset from the diametrically opposed radial holes 66 and 82, so the bushing 54 possesses a symmetry which allows it to be seated in the aperture in two different positions, 180° offset from the other. This provides an advantage to the bushing in that a used bushing may be loosened, withdrawn in the inboard direction, reinserted and fixed into a position rotated 180° from the initial position, thereby providing a new unworn wear surface. This bushing rotation technique does not even require loosening or removal of the inboard end of the shaft from the inboard bushing assembly 46. The bushing subassembly 52 is retained axially in aperture 56 by a washer 86 and a snap ring 88, as shown in FIG. 1. The snap ring 88 engages a groove in cam shaft 36.

The interaction of the flanged end 83 of the bushing 54 with the aperture periphery prevents the bushing subassembly from moving in an outboard direction along the shaft, and the washer 86 and snap ring 88 prevent inboard movement of the bushing subassembly. Acting together, these parts retain the bushing subassembly in place in the aperture.

Although the preferred embodiment has been described and shown as having tabs 90 on the bushing 54 and complementary slots 92 on the periphery of aperture 56, it will be understood that it would be possible to put slots on the bushing and tabs on the periphery of the aperture as an alternative embodiment. It would further be possible to use other known complementary means for retaining the bushing in a non-rotating fashion in the aperture to achieve the desired purpose.

It will be readily understood that the procedure for removing the shaft 36 from the boss 21 will be the reverse procedure from that required in assembly, which means that the removal of the snap ring 88, washer 86 and the bushing subassembly 52 sequentially from the inboard side of aperture 56 permits the shaft to be angled around the flanged portion 18 of the wheel hub, allowing removal and replacement without removal of the wheel hub.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A brake shaft assembly for a vehicle having an axle with a wheel hub at an end of the axle and a brake actuating means located inboard from the wheel hub, the brake shaft assembly comprising:

a shaft having a first end and a second end, the first end of the shaft having a brake actuating lever arm attached thereto and the second end of the shaft having a cam fixed thereon;

a support bracket providing an aperture for passage of the shaft therethrough;

a first bushing assembly supporting the shaft rotatably, substantially parallel to the axle, surrounding the shaft near the first end and retaining the shaft in the aperture of the support bracket a brake spider affixed to the axle, having a boss formed at one end thereof with an aperture for passage of the shaft therethrough, the boss and the aperture defining a cavity; and a second bushing assembly surrounding the shaft near the second end and retaining the shaft in the aperture of the brake spider boss, the second bushing assembly comprising:

the boss, having a hole communicating an outer surface of the boss with the aperture therein;

a cylindrical bushing, with an outside surface sized and adapted to be received in the aperture and an inside surface sized and adapted to receive the shaft and a flanged portion at one end;

a grease zerk fitted in the hole in the boss;

a seal ring seated in a groove on the outside surface of the bushing, providing a seal between the outside surface and an inside surface of the aperture;

a pair of bushing end seals seatable on the shaft for retaining grease in the cavity; and complementary locking means on the boss and the bushing for retaining the bushing in the aperture in a non-rotating manner.

2. The brake shaft assembly of claim 1 wherein the bushing has at least one longitudinal channel on the outside surface thereof.

3. The brake shaft assembly of claim 1 wherein the bushing has at least one longitudinal channel on the inside surface thereof.

4. The brake shaft assembly of claim 1 wherein the seal ring comprises an O-ring.

5. The brake shaft assembly of claim 1 wherein the flanged portion of the bushing has an axial counterbore.

6. A shaft bushing assembly for supporting a portion of a brake shaft rotatably, substantially parallel to an axle having a bracket affixed thereto having an aperture for receiving the bushing, the shaft bushing assembly comprising:
- a boss formed on the bracket and surrounding the aperture, the boss and aperture defining a cavity, with a hole in the boss provided to allow for entry of grease into the cavity;
- a cylindrical bushing, with an outside surface sized and adapted to be received in the cavity and an inside surface sized and adapted to receive the shaft, and provided with a flanged portion at one end thereof for locking engagement with an inboard end of the aperture;
- a grease zerk, fitted in the hole in the boss;
- at least two seals seated at the ends of the bushing for retaining grease in the cavity; and
- a seal ring seated in the outside of the bushing, providing a seal between the bushing outside surface and the aperture;
- wherein the bushing has first and second radial holes, the first radial hole aligned with the grease zerk hole when the bushing is engaged in the aperture and the second radial hole diametrically opposed from the first radial hole, the first radial hole effectively providing a conduit for grease from the zerk to a grease reservoir between the bushing and the shaft and the second radial hole providing a conduit from the grease reservoir to an annular space between the bushing and the aperture, from which annular space grease may be purged through an annular space between the inboard end of the aperture and the flanged portion of the bushing.

7. The shaft bushing assembly of claim 6 wherein the bushing has at least one longitudinal channel formed on the outside surface of the bushing.

8. The shaft bushing assembly of claim 6 wherein the bushing has at least one longitudinal channel formed on the inside surface of the bushing.

9. A brake shaft assembly for a vehicle having an axle with a wheel hub at an end of the axle and a brake actuating means located inboard from the wheel hub, the brake shaft assembly comprising:
- a shaft having a first end and a second end, the first end of the shaft having a brake actuating lever arm attached thereto and the second end of the shaft having a cam fixed thereon;
- a support bracket providing an aperture for passage of the shaft therethrough;
- a first bushing assembly supporting the shaft rotatably, substantially parallel to the axle, surrounding the shaft near the first end and retaining the shaft in the aperture of the support bracket;
- a brake spider affixed to the axle, having a boss formed at one end thereof with an aperture for passage of the shaft therethrough, the boss and the aperture defining a cavity; and
- a second bushing assembly surrounding the shaft near the second end and retaining the shaft in the aperture of the brake spider boss, the second bushing assembly comprising:
  - the boss, having a hole communicating an outer surface of the boss with the aperture therein;
  - a cylindrical bushing, with an outside surface sized and adapted to be received in the aperture and an inside surface sized and adapted to receive the shaft and a flanged portion at one end;
  - a grease zerk fitted in the hole in the boss;
  - a seal ring seated in a groove on the outside surface of the bushing, providing a seal between the outside surface and an inside surface of the aperture;
  - a pair of bushing end seals seatable on the shaft for retaining grease in the cavity; and
  - a pair of diametrically opposed tabs formed on a periphery of the flanged portion of the bushing and a pair of corresponding slots in the periphery of the aperture on the boss for retaining the bushing in the aperture in a non-rotating manner.

10. The brake shaft assembly of claim 9 wherein the locking means on the boss is formed at the periphery of the aperture on an inboard side of the brake spider.

11. The brake shaft assembly of claim 9 wherein the bushing has at least one longitudinal channel on the outside surface thereof.

12. The brake shaft assembly of claim 9 wherein the bushing has at least one longitudinal channel on the inside surface thereof.

13. The brake shaft assembly of claim 9 wherein the seal ring comprises an O-ring.

14. The brake shaft assembly of claim 9 wherein the flanged portion of the bushing has an axial counterbore.

15. A brake shaft assembly for a vehicle having an axle with a wheel hub at an end of the axle and a brake actuating means located inboard from the wheel hub, the brake shaft assembly comprising:
- a shaft having a first end and a second end, the first end of the shaft having a brake actuating lever arm attached thereto and the second end of the shaft having a cam fixed thereon;
- a support bracket providing an aperture for passage of the shaft therethrough;
- a first bushing assembly supporting the shaft rotatably, substantially parallel to the axle, surrounding the shaft near the first end and retaining the shaft in the aperture of the support bracket
- a brake spider affixed to the axle, having a boss formed at one end thereof with an aperture for passage of the shaft therethrough, the boss and the aperture defining a cavity; and
- a second bushing assembly surrounding the shaft near the second end and retaining the shaft in the aperture of the brake spider boss, the second bushing assembly comprising:
  - the boss, having a hole communicating an outer surface of the boss with the aperture therein;
  - a cylindrical bushing, with an outside surface sized and adapted to be received in the aperture and an inside surface sized and adapted to receive the shaft and a flanged portion at one end, and having a first and a second radial hole communicating the outside surface of the bushing to the inside surface of the bushing, the second radial hole being offset 180° from the first radial hole;

a grease zerk fitted in the hole in the boss;

a seal ring seated in a groove on the outside surface of the bushing, providing a seal between the outside surface and an inside surface of the aperture;

a pair of bushing end seals seatable on the shaft for retaining grease in the cavity; and complementary locking means on the boss and the bushing for retaining the bushing in the aperture in a non-rotating manner.

16. The brake shaft assembly of claim 15 wherein the complementary locking means on the boss and the bushing comprise a pair of diametrically opposed tabs formed on a periphery of the flanged portion of the bushing and a pair of corresponding slots in the periphery of the aperture on the boss.

17. The brake shaft assembly of claim 15 wherein a diameter defined by the first and second radial holes is perpendicular to a diameter defined by a pair of diametrically opposed locking means on the flanged portion of the bushing.

18. The brake shaft assembly of claim 17 wherein the pair of locking means are diametrically opposed tabs formed on a periphery of the flanged portion of the bushing.

19. The brake shaft assembly of claim 18 wherein the engagement of the complementary locking means on the bushing and the boss aligns the first radial hole with the hole communicating the outside of the boss with the aperture.

20. The brake shaft assembly of claim 15 wherein the bushing has at least one longitudinal channel on the outside surface thereof.

21. The brake shaft assembly of claim 15 wherein the bushing has at least one longitudinal channel on the inside surface thereof.

22. The brake shaft assembly of claim 15 wherein the seal ring comprises an O-ring.

23. The brake shaft assembly of claim 15 wherein the flanged portion of the bushing has an axial counterbore.

* * * * *